United States Patent Office
3,532,753
Patented Oct. 6, 1970

3,532,753
PESTICIDAL AROMATIC AMINO DERIVATIVES OF HEXAHALOACETONES
Everett E. Gilbert, Morristown, N.J., assignor to Allied Chemical Corporation, New York, N.Y., a corporation of New York
No Drawing. Filed Oct. 26, 1967, Ser. No. 678,202
Int. Cl. C07c 91/40
U.S. Cl. 260—571                                    10 Claims

ABSTRACT OF THE DISCLOSURE

Aromatic amino derivatives of fluoroperhaloacetones represented by the structural formula:

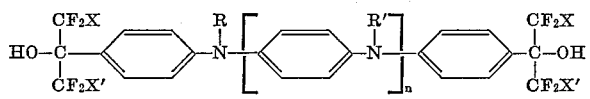

wherein:
(1) R and R' are independently H or hydroxy, alkyl, haloalkyl, aralkyl, aminoalkyl, alkoxy, alkylthio, acyl, aryl, haloaryl, alkaryl, haloalkary, alkylhalo-substituted or carboxyl-substituted aryl groups,
(2) X and X' are independently F or Cl, and
(3) $n$ is 0 or 1.

are prepared by reacting the appropriate fluoroperhaloacetone with the appropriate aromatic amines in the presence of water. The compounds of this invention are useful for controlling insect and fungus pests.

BACKGROUND OF THE INVENTION

This inventio relates to amino derivatives of hexahaloacetones and more particularly to amino derivatives of hexahaloacetones which are useful for controlling insect and fungus pests.

The production of derivatives of hexafluoroacetone, including certain amino derivatives thereof, is known in the art. Thus for example, Gilbert et al., J. Org. Chem. 30, 1001 (1965) discloses aromatic amino derivatives of hexafluoroacetone prepared from aromatic amines, such as N-methylaniline, aniline and 1-naphthylamine. In general, such derivatives are prepared by direct reaction between the amine and anhydrous hexafluoro acetone at a temperature of about 170–200° C. These aromatic amino derivatives, however, have little or no pesticidal activity.

It is an object of this invention to provide novel aromatic amino derivatives of hexahaloacetones.

A further object of this invention is to provide aromatic amino derivatives of hexahaloacetones useful for controlling insect and fungus pests.

Another object of this invention is the provision of a process for preparing aromatic amino derivatives of hexahaloacetones.

These and other objects are apparent from the following detailed description of the invention.

SUMMARY OF THE INVENTION

The objects of this invention are accomplished by producing aromatic amino derivatives and alkali metal and alkaline earth metal salts of aromatic amino derivatives represented by the following structural formula:

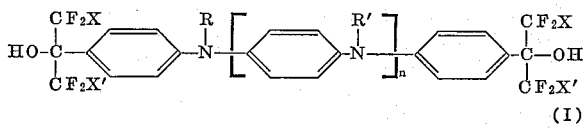

wherein:
(1) R and R' are independently selected from the group consisting of H, alkyl, haloalkyl, aralkyl, aminoalkyl, alkoxy, alkylthio, acyl, hydroxy, aryl, haloaryl, alkaryl, haloalkaryl, alkylhalo-substituted aryl, and carboxyl-substituted aryl,
(2) X and X' are independently selected from the group consisting of F and Cl, and
(3) $n$ is 0 or 1.

The aromatic amino derivatives of this invention are prepared by reacting, in the presence of water, a hexahaloacetone having the formula $CF_2X—CO—CF_2X'$ wherein X and X' have the aforestated meanings with an aromatic amine represented by the formula:

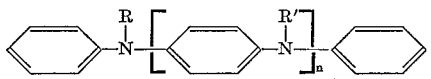

wherein R, R' and $n$ have the aforestated meanings.

The reaction is generally effected by directly contacting the appropriate hexahaloacetone, in the presence of water, with the appropriate amine at temperatures between about 50° C. and about 300° C. The hexahaloacetones are preferably employed in quantities in excess of stoichiometric quantities, although smaller quantities may be used, and when employed in excess, the hexahaloacetones, together with the water, function as a reaction solvent.

The corresponding alkali metal and alkaline earth metal (including magnesium) salts of the aromatic amino derivatives of the hexahaloacetones of the present invention are prepared by reacting the derivatives with an aqueous solution or suspension of the corresponding hydroxide or carbonate of an alkali or alkaline earth metal (including magnesium), generally at slightly elevated temperatures, e.g. between about 20° C. and about 100° C., preferably in amount at least sufficient to satisfy stoichiometric requirements.

The aromatic amino derivatives of hexahaloacetones of this invention and the alkali metal and alkaline earth metal (including magnesium) salts thereof may be employed in the control of insect and fungus pests.

DESCRIPTION OF THE PREFERRED EMBODIMENTS

With reference to Formula I for the aromatic amino derivatives of hexahaloacetones of this invention, X and X' are preferably F.

When the substituents R and R' in Formula I above are alkyl, haloalkyl, aralkyl, aminoalkyl, alkoxy, alkylthio, alkaryl, haloalkaryl, or alkylhalo-substituted aryl groups, the alkyl portion of the substituent may be linear, cyclic or branched chain, preferably containing up to about 12 carbon atoms, more preferably up to about 6 carbon atoms. The methyl group is the preferred alkyl substituent. When in Formula I above $n$ is 1, R and R' are most preferably both H.

When one or both of the R and R' substituents are acyl groups, they are preferably derived from linear or branched chain aliphatic carboxylic acids having up to about 12 carbon atoms, more preferably up to about 6 carbon atoms. Specific examples of preferred acyl groups are the propionyl, acetyl, and formyl groups, the latter being the most preferred acyl substituent.

When the substituents R and R' in Formula I above are aryl, haloaryl, alkaryl, haloalkaryl, or alkylhalo-substituted aryl groups, the aryl portion of the substituent may be mononuclear or polynuclear having condensed nuclei, the mononuclear aryl substituents being preferred.

The reaction of the aromatic amines with the hexahaloacetones must be carried out in the presence of water. If conducted under anhydrous conditions, the reaction yields unidentified tarry masses. So, for instance, in the reaction of diphenylamine with anhydrous hexafluoroacetone the product was an unidentifiable tarry mass. Preferably the hexahaloacetone is employed as a reactant associated with at least one mol of water per mol of acetone, preferably about 3 mols of water per mol of acetone when the reaction is to be conducted at atmospheric pressure at the reflux temperature of the reaction mixture. Use of larger amounts of water serves no useful purpose, but tends to reduce the solubility of the amine reactant in the reaction mixture and tends to reduce the rate of the reaction, hence is preferably avoided.

To increase the rate of reaction, the process may be carried out in closed pressure vessels under superatmospheric pressures at temperatures above the atmospheric pressure reflux temperature of the reaction mixture.

Reaction temperautres are not critical. Suitable reaction temperatures range between about 50° C. and about 300° C., preferred reaction temperatures ranging between about 70° C. and about 200° C. For operation at atmospheric pressure the reflux temperature of the reaction mixture is a convenient reaction temperature.

The molar ratio in which the reactants may be employed is not critical. To obtain substantial completion of the reaction and substantially complete utilization of the amine reactant, it is preferred to employ the hexahaloacetone reactant in excess of stoichiometrically required amount. Preferred mol ratio of hexahaloacetone:amine reactant range between about 4:1 to 12:1 for operation at atmospheric pressure, and between about 4:1 to 6:1 for operation at superatmospheric pressure.

It is not necessary to initially add all of the hexahaloacetone reactant to the reaction mixture. For example, the reaction may be initiated in a reaction mixture containing the amine reactant, the water, but only part of the stoichiometrically required amount of hexahaloacetone, and the hexahaloacetone may be replenished in the reaction mixture as it is being consumed in the reaction by continual or intermittent addition of the hexahaloacetone, preferably in substantially anhydous form. In the case of those hexahaloacetones useful in the practice of the present invention which in anhydrous form are gaseous at normal room temperature and pressure, viz hexafluoroacetone (B.P. −27.4° C.) and chloropentafluoroacetone (B.P. 7.8° C.), this may be accomplished by bubbling the gaseous substantially anhydrous hexahaloacetone directly into the reaction mixture. If the hexahaloacetone is to be replenished in the reaction mixture as it is being consumed in the reaction, it is preferred to commence the reaction of the amine reactant with the hexahaloacetone, the latter preferably being associated with about 1 to 3 mols of water per mol of acetone, in a reaction mixture comprising between about 1 to 2 mols of the amine reactant per mol of hexahaloacetone, to conduct the reaction at atmospheric pressure at the boiling point of the reaction mixture, and to replenish, preferably on a continuous basis, the hexahaloacetone at approximately the rate at which it is consumed in the reaction.

The aromatic amino derivative of hexafluoroacetone products, upon completion of the reaction, may be separated from the reaction mixture by conventional methods, as e.g. by drowning the reaction mixture in cold water to obtain the product as an oil or a solid, or by distilling off water and unreacted hexahaloacetone, if present, to obtain the desired product as a residue. The separated product may optionally be purified by conventional methods as e.g. fractional distillation under reduced pressure, or fractional crystallization.

The following examples further illustrate the preparation of the compounds of the invention and the scope of the invention is not to be limited thereby.

Example I 17 grams (0.1 mol) of diphenylamine and 88 grams (0.4 mol) of hexafluoroacetone·3H$_2$O were mixed and refluxed (ca. 105° C.) for 100 hours. The solution remained clear throughout the period and at the end thereof the reaction mixture was poured into 500 milliliters of cold water, resulting in the separation of a heavy oil. The heavy oil, upon stirring, solidified into a solid which was separated from the water by filtration and was air dried. The crude yield of product, 4,4′ - (hexafluoro - 2-hydroxy-2-propyl) diphenylamine, was 50 grams. The product, after recrystallization form a hexane-toluene mixture, had a melting point of 85–87° C.

The structure of the compound was proved by hydrolysis to the known 4,4′-dicarboxydiphenylamine, using essentially the procedure of Farah et al., J. Org. Chem. 30 (4), 1006 (1965).

The following procedure was used to convert the product into its sodium salt. 6 grams of 4,4′-(hexafluoro-2-hydroxy-2-propyl) diphenylamine were mixed with dilute aqueous sodium hydroxide (0.8 gram, 0.02 mol, in 20 milliliters of water) and warmed, resulting in a clear solution. The solution was evaporated to dryness to produce 8 grams of the sodium salt of 4,4′-(hexafluoro-2-hydroxy-2-propyl) diphenylamine, a hard, white, non-hygroscopic solid.

Example II 12 grams (0.05 mol) of triphenylamine and 66 grams (0.3 mol) of hexafluoroacetone·3H$_2$O were mixed and refluxed for 100 hours. The reaction mixture was then drowned in 500 ml. of cold water, resulting in separation of a white product of "taffy-like" consistency. The product was separated from the water by filtration and was air dried. The crude yield of product was 29 grams. The product, 4,4′-(hexafluoro-2-propyl) triphenylamine, after recrystallization from hexane, had a melting point of 121° C. Elemental analysis showed a fluorine content of 39.5% (theory 39.5%). The triphenylamine reacted only on two of the available phenyl groups even though an excess of the hexafluoroacetone reactant was employed.

The product was converted to the corresponding sodium salt following the general procedure given in Example I. The sodium salt so obtained did not melt at temperatures up to 300° C.

Example III 10 grams of N-formyldiphenylamine and 44 grams of hexafluoroacetone·3H$_2$O were mixed and refluxed for 72 hours. The solution remained clear throughout the period and at the end thereof the mixture was drowned in 500 milliliters of cold water, resulting in separation of 22 grams (theory 26.5 grams) of the product, 4,4′-(hexafluoro-2-hydroxy-2-propyl)-N - (formyl) diphenylamine as a viscous yellow oil which did not solidify upon standing for weeks. The sodium salt of the product, prepared according to the general procedure given in Example I, decomposed when heated to 130° C.

Example IV 13 grams of N,N′-dihphenyl-paraphenylenediamine and 55 grams of hexafluoroacetone·3H$_2$O were mixed and refluxed for 80 hours. The reaction mixture was then drowned in 500 ml. of cold water resulting in separation of a grey precipitate, which was separated from the water by filtration. The filter cake was dried in air to yield 25 grams (theory 30 grams) of the product having the formula

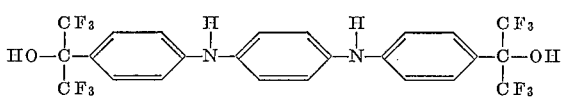

Elemental analysis of the product showed fluorine content of 39% (theory 38.6%). The product was soluble in acetone, isopropanol, and dilute NaOH; it was insoluble in water. The product coagulated readily upon precipitation from dilute aqueous NaOH solutions with HCl. Product so precipitated had a melting point of about 157° C.

The disodium salt of the product, a free-flowing non-hydroscopic brown solid, was prepared according to the general procedure given in Example I. The salt so prepared decomposed when heated to 235–245° C.

Example V 18 grams of N-methyldiphenylamine and 66 grams of hexafluoroacetone·2H₂O were mixed and refluxed for 100 hours. The reaction mixture was then drowned in 500 ml. of cold water, resulting in the separation of a heavy oil, which slowly solidified. The product, 4,4'-(hexafluoro-2-hydroxy-2-propyl)-N-methyldiphenylamine, was separated from the water by filtration and was air dried. The melting point of the crude product was 68–78° C.

The product was converted to the corresponding sodium salt following the general procedure given in Example I.

The sodium salt of the product so obtained was a bluish-white solid, M.P. 265–270° C.

Table A below lists illustrative hexahaloacetones and aromatic amino compounds suitable for preparation of aromatic amino derivatives of hexafluoroacetones in accordance with this invention. In the structural formulas in Table A, the alkyl and alkylene groups, unless specifically indicated otherwise, denote linear alkyl and alkylene groups. The hexahaloacetone reactants are commercially available. Some of the aromatic amino reactants, as e.g., diphenylamine, triphenylamine, N-formyldiphenylamine, N,N' - diphenyl - paraphenylenediamine, N - methyldiphenylamine, and N,N-diphenylanthranilic acid are commercially available compounds; others may be prepared by conventional methods known to those skilled in the art.

3,532,753
TABLE A—Continued
| | Amine reactant | Hexahaloacetone | Product |
|---|---|---|---|
| (9) | 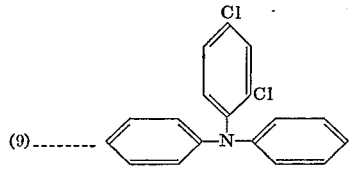 | CF₂Cl—CO—CF₂Cl | 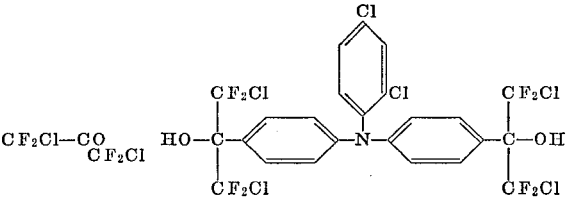 |
| (10) | 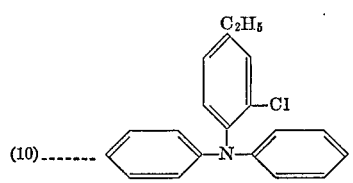 | CF₃—CO—CF₃ | 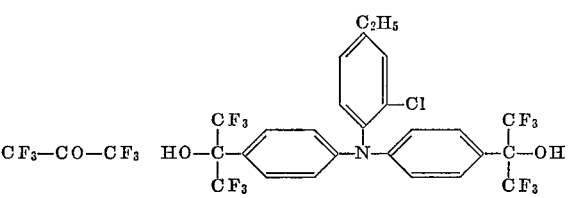 |
| (11) | 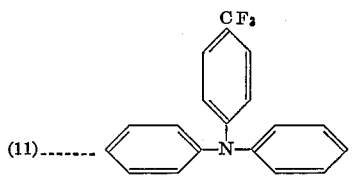 | CF₃—CO—CF₃ | 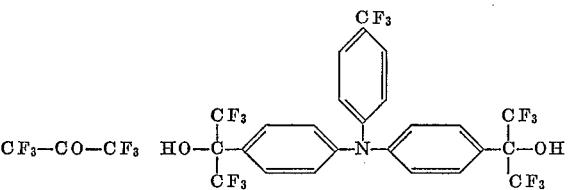 |
| (12) | 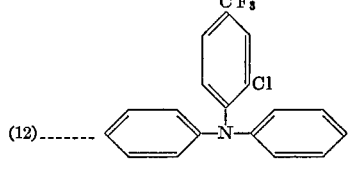 | CF₃—CO—CF₃ | 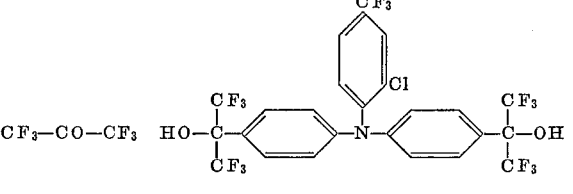 |
| (13) | 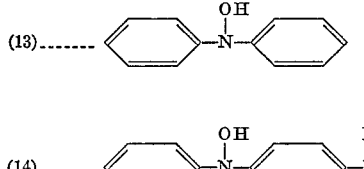 | CF₂Cl—CO—CF₂Cl | 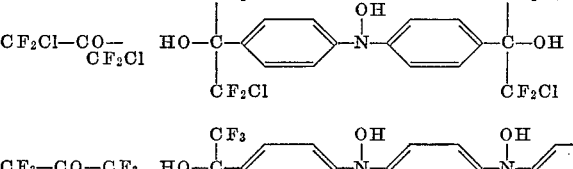 |
| (14) |  | CF₃—CO—CF₃ |  |
| (15) | 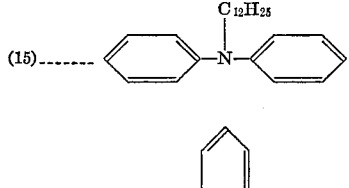 | CF₃—CO—CF₃ | 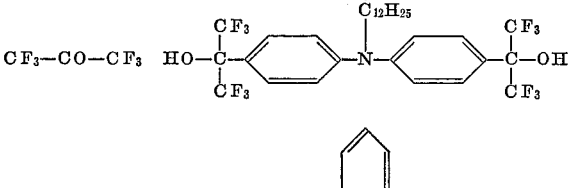 |
| (16) | 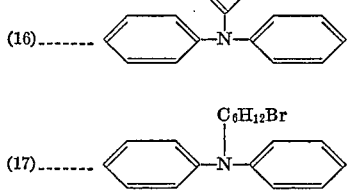 | CF₃—CO—CF₃ | 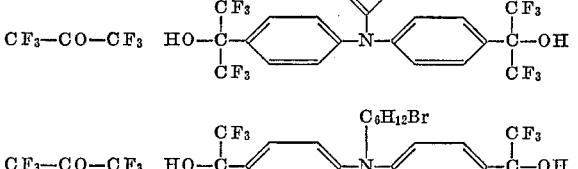 |
| (17) | 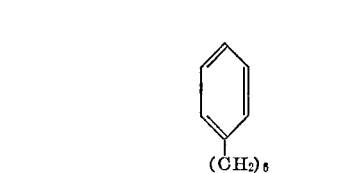 | CF₃—CO—CF₃ | 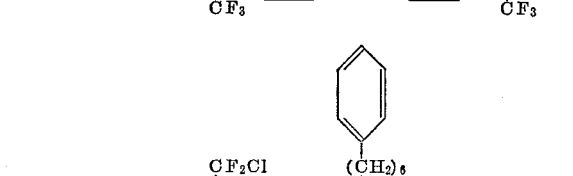 |
| (18) | 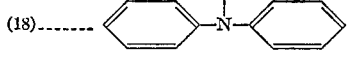 | CF₂Cl—CO—CF₂Cl | 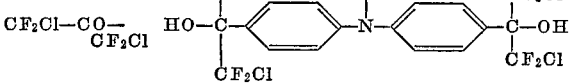 |

TABLE A—Continued

| Amine reactant | Hexahaloacetone | Product |
|---|---|---|
| (19) | $CF_3-CO-CF_3$ | |
| (20) | $CF_3-CO-CF_3$ | |
| (21) | $CF_2Cl-CO-CF_3$ | |
| (22) | $CF_3-CO-CF_3$ | |
| (23) | $CF_3CO-CF_3$ | |
| (24) | $CF_3-CO-CF_3$ | |
| (25) | $CF_3-CO-CF_3$ | |
| (26) | $CF_3-CO-CF_3$ | |
| (27) | $CF_3-CO-CF_3$ | |

The aromatic amino derivatives of hexahaloacetone of this invention and their alkali and alkaline earth metal (including magnesium) salts have utility as insecticides, fungicides, and/or antifertility agents on houseflies. The antifertility activity on houseflies of illustrative compounds of the invention is shown in the following illustrative efficacy tests.

Dry food (6 parts powdered non-fat milk, 6 parts granulated sugar and 1 part powdered egg) was treated with a compound of the invention, and the treated food placed in emergence cages, containing fly pupae. Nine days after the start of the tests, oviposition medium was placed in the cages and the medium was then moistened and examined every day for eggs.

Test results are shown in Table B below:

TABLE B

| Derivative of hexafluoroacetone | Percent compound in bait | No. flies | Percent killed | Eggs laid |
|---|---|---|---|---|
| $(C_6H_5)_2NC_6H_5$ | 1.0 | 51 | 56.9 after 9 days | Very few. |
| Sodium salt of above | 1.0 | 48 | 45.8 after 8 days | Do. |
| $(O_6H_5)_2NCH_3$ | 0.5 | 48 | 60.5 after 8 days | None. |
| Sodium salt of above | 1.0 | 48 | 95.8 after 8 days | Very few. |
| $C_6H_5NHC_6H_4NHC_6H_5$ | 1.0 | 47 | 38.3 after 8 days | None. |
| Sodium salt of above | 1.0 | 46 | 43.5 after 8 days | Few. |

Concurrently run check tests employing untreated food showed no diminution of egg laying activity.

This invention may be embodied in other forms, or carried out in other ways, without departing from the spirit or essential characteristics thereof. The present embodiment is, therefore, to be considered in all respects as illustrative and not restrictive, the scope of the invention being solely limited by the appended claims.

I claim:

1. Compounds having the formula:

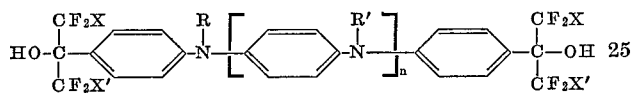

wherein:
 (1) R and R' are independently selected from the group consisting of hydrogen, hydroxy, alkyl, haloalkyl, aralkyl, aminoalkyl, alkoxy, alkylthio, aryl, haloaryl, alkaryl, haloalkaryl, and alkylhalo-substituted aryl,
 (2) X and X' are independently selected from the group consisting of fluorine and chlorine, and
 (3) $n$ is 0 or 1,
and their alkali metal and alkaline earth metal salts.

2. Compounds according to claim 1 wherein $n$ is 0.

3. Compounds according to claim 1 wherein X and X' are both fluorine and wherein $n$ is 0.

4. A compound according to claim 1 wherein X and X' are both fluorine, $n$ is 1, and R and R' are both hydrogen.

5. A compound according to claim 1 wherein X and X' are both fluorine, $n$ is 0, and R is hydrogen.

6. Compounds according to claim 1 wherein X and X' are both fluorine, $n$ is 0, and R is alkyl.

7. Compound according to claim 1 wherein X and X' are both fluorine, $n$ is 0, and R is aryl.

8. The sodium salts of compounds according to claim 1.

9. A process for preparing compounds according to claim 1 which comprises reacting, in the presence of water, an aromatic amino compound having the formula

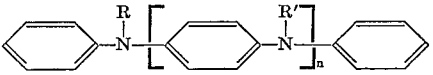

wherein R and R' are independently selected from the group consisting of hydrogen, hydroxy, alkyl, haloalkyl, aralkyl, aminoalkyl, alkoxy, alkylthio, aryl, haloaryl, alkaryl, haloalkaryl, and alkylhalo-substituted aryl, and $n$ is 0 or 1, with a hexahaloacetone reactant having the formula $$CF_2X-CO-CF_2X'$$

wherein X and X' are independently selected from the group consisting of fluorine and chlorine, said water being present in a ratio of at least about one mol per mol of hexahaloacetone.

10. The process according to claim 9 which comprises the steps of (1) mixing the aromatic amino compound with hexahaloacetone reactant, in a ratio of between about 1 to 2 mols of the aromatic amino compound per mol of hexahaloacetone, (2) heating the mixture to reaction temperature above about 50° C., and (3) replenishing hexahaloacetone consumed in the reaction with substantially anhydrous hexahaloacetone while maintaining the reaction mixture at reaction temperature above about 50° C.

References Cited

UNITED STATES PATENTS 3,405,177   10/1968   Jones _____ 260—571 X

FOREIGN PATENTS 1,325,204   3/1963   France.

CHARLES B. PARKER, Primary Examiner

C. F. WARREN, Assistant Examiner

U.S. Cl. X.R.

260—519, 570.5, 570.8, 573, 999

PO-1050
(5/69)

UNITED STATES PATENT OFFICE
CERTIFICATE OF CORRECTION

Patent No. 3,532,753          Dated    October 6, 1970

Inventor(s) Everett E. Gilbert

It is certified that error appears in the above-identified patent and that said Letters Patent are hereby corrected as shown below:

Column 1, line 23, "haloalkary" should read -- haloalkaryl -- line 34, "inventio" should read -- invention --

Column 3, line 14, "temperautres" should read -- temperatures --

Column 4, line 29, after "2-", -- hydroxy-2- -- should be inserted

Column 5, line 6, "2H$_2$O" should read -- 3H$_2$O --

Table A, first formula under "Hexahaloacetone", that portion of the formula reading "...CF$_3$Cl" should read -- ...CF$_2$Cl --

Column 8, sixth formula under "Product", that portion of the formula reading "...$\overset{\overset{OH}{|}}{N}$...", second occurence, should read -- ...$\overset{\overset{H}{|}}{N}$... --

Column 10, seventh formula under "Product", that portion of the formula reading "...$\overset{CF_2}{\bigwedge}$..."

should read -- ...$\overset{CH_2}{\bigwedge}$... --

PO-1050
(5/69)

UNITED STATES PATENT OFFICE
CERTIFICATE OF CORRECTION

Patent No. 3,532,753      Dated October 6, 1970

Inventor(s) Everett E. Gilbert      PAGE - 2

It is certified that error appears in the above-identified patent and that said Letters Patent are hereby corrected as shown below:

Column 11, Table B, third formula under "Derivative of hexafluoroacetone", that portion of the formula reading "($O_6H$..." should read -- ($C_6H$... --

Column 11, line 43, "hy;drogen" should read -- hydrogen -- line 48, "Compound" should read -- Compounds --

(SEAL)
Attest:

Edward M. Fletcher, Jr.
Attesting Officer

WILLIAM E. SCHUYLER, JR.
Commissioner of Patents